July 30, 1968  L. W. STYLES  3,394,794
DRIVING BELTS

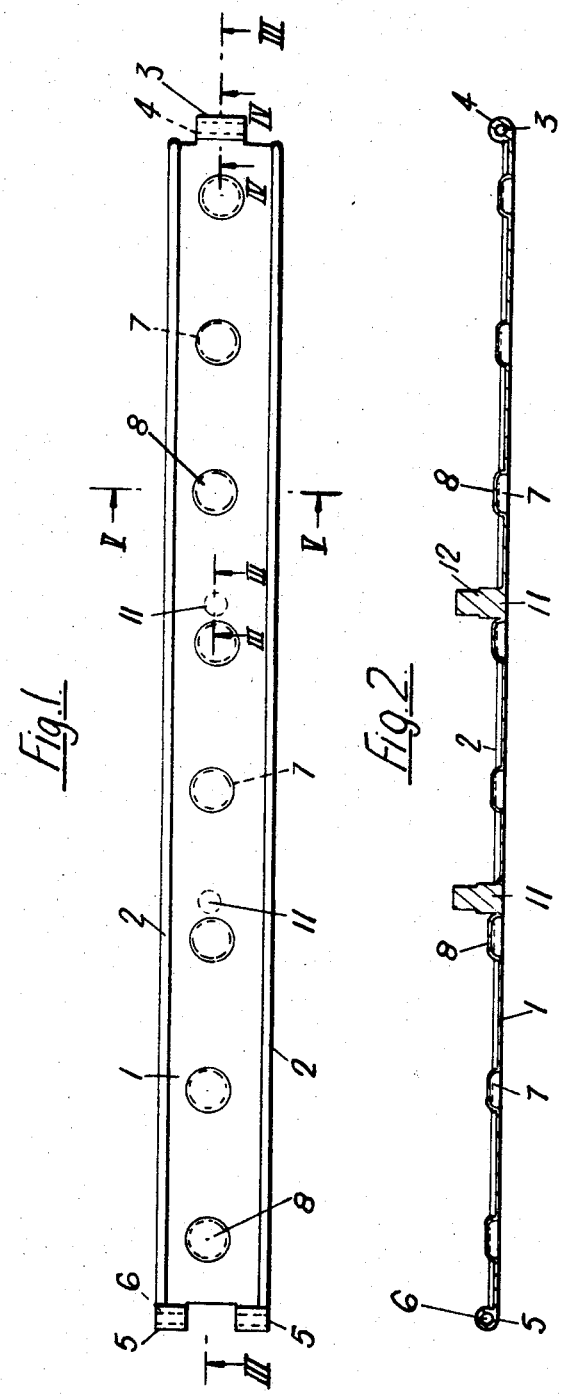

Filed March 14, 1966  2 Sheets-Sheet 2

Inventor
Leonard Walter Styles
By Cushman, Darby & Cushman
Attorneys

United States Patent Office 3,394,794
Patented July 30, 1968

3,394,794
DRIVING BELTS
Leonard Walter Styles, Tottenham, London, England, assignor to Gestetner Limited, Tottenham, London, England, a British company
Filed Mar. 14, 1966, Ser. No. 534,136
Claims priority, application Great Britain, Mar. 17, 1965, 11,363/65
10 Claims. (Cl. 198—193)

ABSTRACT OF THE DISCLOSURE

This invention provides a driving belt suitable for use in stencil duplicators, the belt comprising a unitary elongate flat strip of a single substantially inextensible synthetic resin material having opposed faces and having therein a series of longitudinally spaced apertures to receive driving bosses on the driving and driven members intended to be coupled by the belt and a series of dome-like covers integral with the strip and projecting from one face thereof, one for each of said apertures, closing and reinforcing the apertures on said one face of the strip.

---

Figure 3:
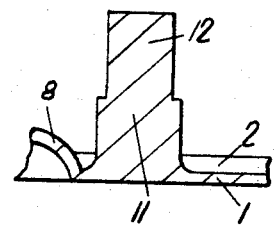

This invention concerns driving belts and more particularly, but not exclusively, driving belts suitable for stencil duplicators of the twin cylinder type.

In twin cylinder stencil duplicators it is essential that the two cylinders rotate in synchronism and this is achieved in practice by one cylinder being positively driven from the motor of the duplicator and the other cylinder being driven from the first cylinder by driving belts coupling the two cylinders together at each end thereof. Such belts must be substantially inextensible and in the construction most used hitherto, each cylinder has near each end thereof a circumferentially arranged series of equi-angularly spaced hemispherical bosses and each driving belt comprises a band of spring steel having a series of circular apertures therethrough into which the said bosses engage. In order that a steel band of a thickness adequate to provide a reasonable life should have sufficient flexibility to bend to the curvature of the cylinders it has been found necessary to provide such a band with further apertures, these usually being in the form of longitudinally extending slots cut in the parts of the band between the said circular apertures.

Production of steel bands used as stencil duplicator driving belts require careful and relatively complicated manufacturing techniques in order to obtain a band which gives a satisfactory life on the machine. The choice of belt materials is limited by the requirement that the belt should be substantially inextensible and until recently there were available no materials, alternative to spring steel, which could be made into stencil duplicator driving belts by simpler manufacturing techniques.

Latterly synthetic resin materials which are substantially inextensible have been produced and offer scope for producing belts by simpler manufacturing techniques.

It is an object of this invention to provide an improved driving belt which is suitable for use in place of the steel band hitherto used in stencil duplicators.

The driving belt of this invention comprises a unitary elongate flat strip of a single substantially inextensible synthetic resin material having opposed faces and having therein a series of longitudinally spaced apertures to receive driving bosses on the driving and driven members intended to be coupled by the belt and a series of dome-like covers integral with the strip and projecting from one face thereof, one for each of said apertures, closing and reinforcing the apertures on said one face of the strip.

Eminently suitable synthetic resin materials are polypropylene, which can readily be moulded, and that acetal resin of composition $(-OCH_2-)_n$ derived by polymerisation of formaldehyde sold by E. I. du Pont de Nemours & Co. Inc. under the registered trademark "Delrin."

We have found that, whereas a band of substantially inextensible synthetic resin material provided with simple apertures will not in practice be suitable as a driving belt, reinforcement of the apertures by dome-like covers integral with the band renders such a band suitable as a driving belt. Such belts are easier to produce than conventional metal bands and may, for example, be made in one piece.

Further, a belt according to this invention has the additional advantages that it lacks sharp edges and when dirty can readily be cleaned, is sufficiently flexible so that it does not require additional apertures which would weaken the belt, is less noisy in use and enables the studs required to receive screen and stencil mounting bars to be formed integrally with the belt.

Figure 4:
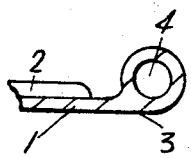

In order that this invention may more readily be understood, one embodiment of driving belt according to the invention will now be described by way of example with reference to the accompanying drawings, in which:

FIGURE 1 is a plan view of this embodiment of belt;
FIGURE 2 is a longitudinal section on the line II—II of FIGURE 1;
FIGURES 3 and 4 are fragmentary sections on the lines III—III and IV—IV respectively of FIGURE 2; and,
FIGURE 5 is a cross-section through the belt on the line V—V of FIGURE 2.

The illustrated embodiment is a driving belt for a twin cylinder stencil duplicator and is a one piece moulding of polypropylene. Its form is basically that of a flat strip 1 of a constant width of 0.75 inch (1.9 cms.) and a thickness of 0.020 inch (0.05 cm.). Projecting outwardly from one face of the strip along each longitudinal edge thereof is a reinforcing beading 2 having the cross-sectional form of a semi-circle of radius about 0.032 inch (0.08 cm.). At one end of the strip (the right-hand end in FIGURES 1 and 2) a central portion 3 of width 0.320 inch (0.8 cm.) projects beyond the remainder of the strip and is thickened, on the same face as that from which the beading 2 projects, to substantially hollow cylindrical form having an axial bore 4 as shown clearly in FIGURE 4. The external radius of the portion 3 is 0.062 inch (0.157 cm.) and the bore 4 has a radius of approximately 0.032 inch (0.08 cm.), the axis of the cylindrical portion 3 and bore 4 being parallel to the width of the strip. At the other end of the strip, two side portions 5 of width 0.205 inch (0.52 cm.), one on each side of a central portion of width 0.340 inch (0.86 cm.) extend outwardly in the same way as the central portion 3 of the first mentioned end and are thickened to similar hollow cylindrical form, having bores 6, the arrangement being such that the strip 1 can be formed into a continuous loop by bringing the two ends together with the central portion 3 between the side portions 5 and with the bores 4 and 6 in such portions aligned and by passing a hinge pin (not shown) through the three aligned portions.

Figure 5:
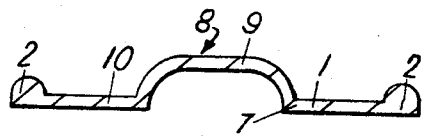

At regular longitudinal intervals of 0.986 inch (2.5 cms.) the strip is provided centrally thereof with circular apertures 7 of radius 0.125 inch (0.32 cm.), each aperture being closed on that side of the strip from which the beading 2 projects by dome-like covers 8 each of which, as clearly shown in FIGURE 5, has a flat central circular section 9 spaced from the opposite side of the aperture by a distance of 0.075 inch (0.19 cm.) and a curved rim section 10 of radius of curvature 0.075 inch (0.19 cm.) joining such central section to the part of the strip around the aperture, the thickness of the covers 8 being the same as that of the strip. The belt is adapted to be driven by bosses projecting from the cylinders of the duplicator and having a height of approximately 0.075 inch (0.19 cm.). The much larger size of the apertures 7 in the strip 1 and the shaping of the covers 8 as described ensures that there is no tendency for the belt to be lifted off the cylinders by the said bosses as the latter engage in, or disengage from, the apertures.

At suitable positions along the strip outwardly project from the same face as that from which the covers 8 project two studs 11 for receiving screen and stencil mounting bars. Each stud is of cylindrical form and has its outer half 12 of a reduced diameter as compared with the half nearer to the strip. The total height of the stud 11 measured from the face of the strip opposite that from which the stud projects is 0.332 inch (0.843 cm.). The diameter of the outer half of the stud is approximately 0.123 inch (0.312 cm.) and that of the other half is approximately 0.154 inch (0.39 cm.).

It will be appreciated that longer belts may be formed by using two or more strips as described above joined end to end by hinge pins.

We claim:

1. A driving belt comprising a unitary elongate flat strip of a single substantially inextensible synthetic resin material having opposed faces and having therein a series of longitudinally spaced apertures to receive driving bosses on the driving and driven members intended to be coupled by the belt and a series of dome-like covers integral with the strip and projecting from one face thereof, one for each of said apertures closing and reinforcing the apertures on said one face of the strip.

2. The belt specified in claim 1 in which the synthetic resin material is polypropylene.

3. The belt specified in claim 1, in which the synthetic resin material is that material sold under the registered trademark "Delrin."

4. The belt specified in claim 1, and including at the ends of the belt interfittting projections having bores therethrough to receive a hinge-pin when said bores are aligned.

5. The belt specified in claim 1, in which each of said dome-like covers comprises a flat central circular section and a curved rim section joining the said central section to the remainder of the strip around the appropriate aperture.

6. The belt specified in claim 1, in which the said apertures are circular and the dome-like covers project from said one face of the strip by a distance less than the radius of the apertures.

7. The belt specified in claim 1 including at least one stud projecting outwardly from the said one face of the strip.

8. A driving belt comprising a unitary elongate flat strip of a single substantially inextensible synthetic resin material having opposed faces and having therein a series of longitudinally spaced apertures to receive driving bosses on the driving and driven members intended to be coupled by the belt, a series of dome-like covers integral with the strip and projecting from one face thereof, one for each of said apertures closing and reinforcing the apertures on said one face of the strip, and a reinforcing beading extending longitudinally of the strip along each side edge thereof.

9. The belt specified in claim 8, in which said beading has a semi-circular cross-section.

10. A driving belt for coupling driving and driven members and comprising a unitary elongate flat strip of a single substantially inextensible synthetic resin material having parallel side edges extending longitudinally of the strip and parallel opposed faces and also having therein a series of longitudinally spaced identical circular apertures for receiving driving bosses on the driving and driven members intended to be coupled by the belt and a series of dome-like covers integral with the strip, and projecting from one face thereof, one such cover closing and reinforcing each aperture, each cover comprising a flat contral circular section spaced from said one face by a distance less than the radius of said apertures and a curved rim section joining the said central section to the remainder of the strip around the aperture closed by such cover.

References Cited
UNITED STATES PATENTS

| | | | |
|---|---|---|---|
| 856,565 | 6/1907 | Balch | 74—231 |
| 2,724,974 | 11/1955 | Ayres. | |
| 3,245,518 | 4/1966 | Reibel et al. | 74—231 XR |

FRED C. MATTERN, JR., *Primary Examiner.*

J. A. WONG, *Assistant Examiner.*